Sept. 24, 1957 W. A. RAY 2,807,689
FLUID CONTROL VALVE
Original Filed April 28, 1951 2 Sheets-Sheet 1
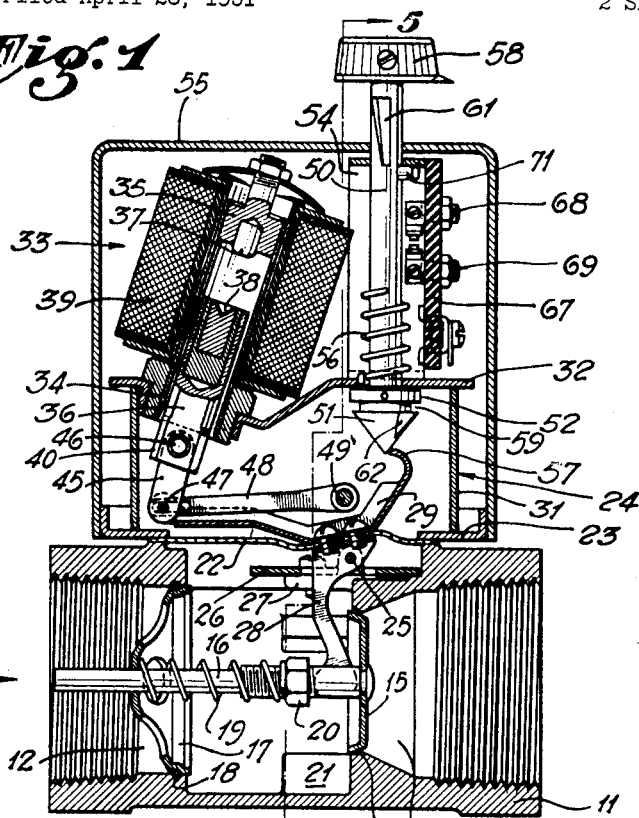
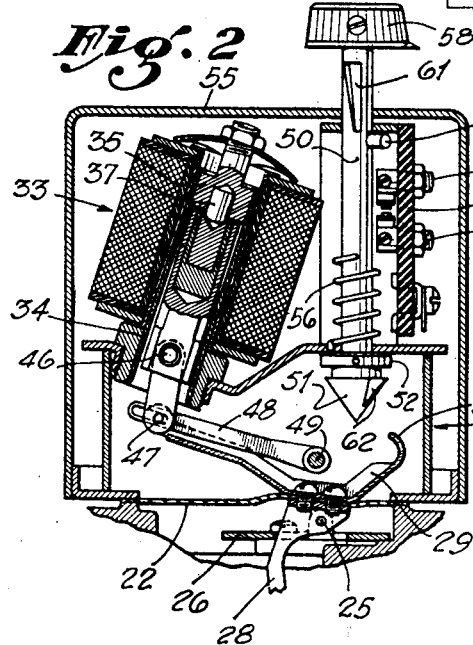
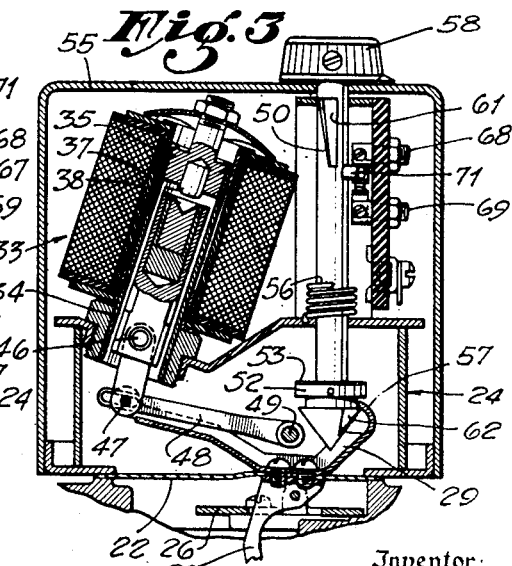
Inventor:
WILLIAM A. RAY,
By John Flam
Attorney.

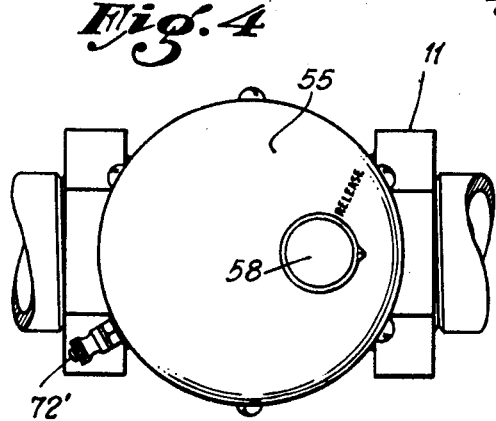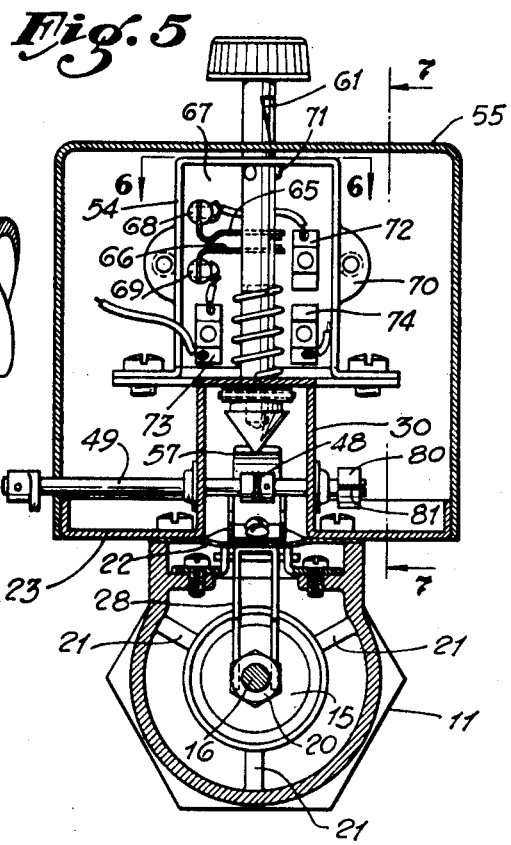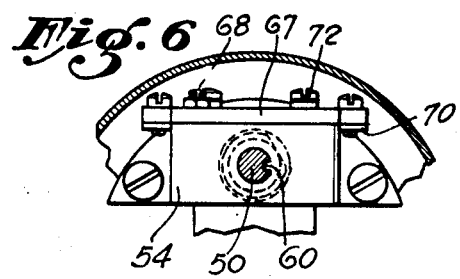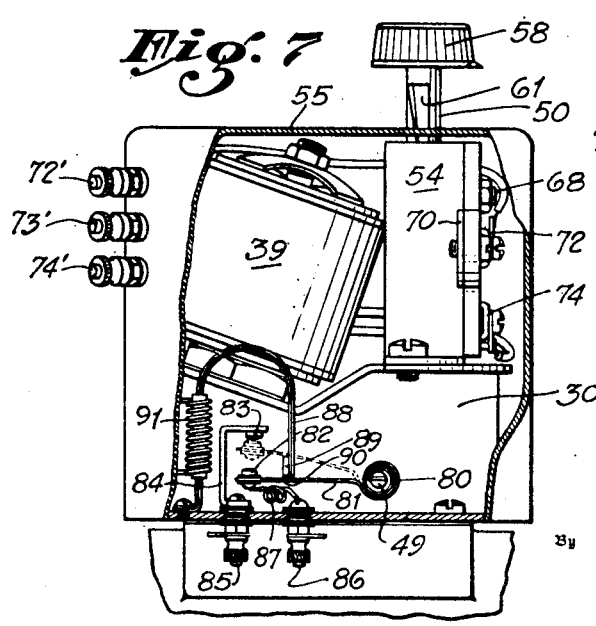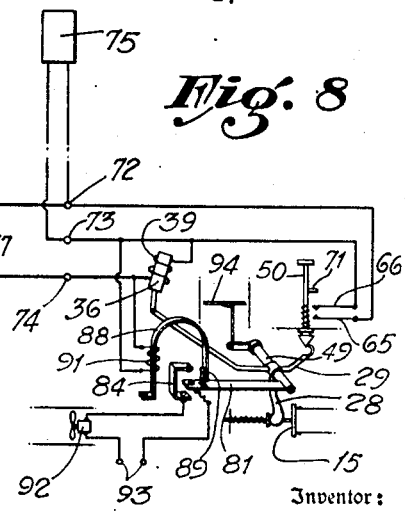
Inventor:
WILLIAM A. RAY,
John Flam
Attorney.

United States Patent Office 2,807,689
Patented Sept. 24, 1957

2,807,689

FLUID CONTROL VALVE

William Alton Ray, North Hollywood, Calif., assignor to General Controls Co., a corporation of California Original application April 28, 1951, Serial No. 223,496, now Patent No. 2,712,429, dated July 5, 1955. Divided and this application August 10, 1953, Serial No. 377,461

7 Claims. (Cl. 200—116)

This invention relates to valves particularly designed for the control of gaseous fuels, and operated by an electromagnet.

This application is a division of application Serial No. 223,496, filed April 28, 1951, now Patent No. 2,712,429, issued July 5, 1955, said application being a continuation of application Serial Number 544,511, filed July 12, 1944, now abandoned, and which is a division of application Serial Number 407,932, filed August 22, 1941, now Patent No. 2,358,999, granted September 26, 1944.

An object is the provision of means for delaying the actuation of condition-controlling means, such as switching means, for a predetermined interval after the operation of movable means, such as a valve operator, the delaying means being effective subsequently to delay the deactuation of the condition-controlling means for a predetermined interval after the return of the movable means to unoperated position.

Another object is the provision, in a time-delay system of the character described, of means for effecting a two-way snap-action of the condition-controlling means.

Other objects and advantages of the invention will be found in the description, the drawing, and the claims; and, for full understanding of the invention, reference is to be had to the following detailed description and accompanying drawing, wherein:

Figure 1 is a vertical sectional view of a solenoid-operated valve embodying features of the invention;

Figures 2 and 3 are fragmentary views, similar to that of Fig. 1, showing the parts in positions assumed in operation;

Figure 4 is a plan of the valve shown in Fig. 1;

Figure 5 is a vertical section, taken along the irregular line 5—5 of Fig. 1;

Figure 6 is a fragmentary horizontal section, taken along the line 6—6 of Fig. 5;

Figure 7 is a side elevation, taken in the plane of line 7—7 of Fig. 5, with the housing 55 broken away to show, in particular, the time-delay mechanism; and Figure 8 is a diagrammatic view of the apparatus shown in the other figures, along with an appropriate electrical control circuit therefor.

In the drawing, the numeral 11 indicates a valve casing having an inlet 12 and an outlet 13, the inner portion of the casing adjacent the outlet being built up to provide an annular valve seat 14. Cooperable with this seat is a dished closure member 15 secured to one end of a valve stem 16, the other end portion of the stem extending freely through a central opening in an otherwise apertured cup-shaped washer 17 located in the inlet of the casing and held from outward movement by a wire ring 18 snapped into a groove formed in the inlet wall, and engageable with the periphery of the washer. A spring 19, surrounding the valve stem 16 and compressed between the washer 17 and a nut 20 threaded on an intermediate portion of the stem, serves to urge the closure member 14 toward its seat and the washer 17 against its retaining snap ring. The periphery of the closure member 14 is guided by three spaced portions 21 extending from the inner wall of the casing.

Covering an opening through the top wall of casing 11 is a flexible diaphragm 22, of material such as leather, or thin sheet metal, the marginal portion of which is clamped between the casing and the bottom flange 23 of a sub-housing, generally indicated at 24, attached to the casing. Pivoted on a pin 25, mounted in spaced brackets 26 attached to horizontal platforms 27 extending from the upper inner side walls of the casing (Fig. 5), is a U-shaped arm 28, the rounded lower extremities of which straddle the portion of valve stem 16 between the closure member 15 and nut 20. The upper cross-portion of arm 28 abuts the underside of diaphragm 22, and above it is the medial portion of a channelled lever 29, the arm 28 and lever 29 being secured together and to the diaphragm at these portions by screws. It is thus apparent that the arm and the lever can be rocked as a unit on pin 25 to operate the closure member 15, the pin 25 being located as close as is practicable to the plane of the diaphragm so as to minimize flexure of the same. The general valve-operating arrangement thus far described is disclosed in my copending application, Serial Number 378,756, filed February 13, 1941, now Patent No. 2,354,704, issued August 1, 1944; and is claimed in a division of the aforesaid application, Serial Number 536,699, filed May 22, 1944, now Patent No. 2,442,877, granted June 18, 1948.

The sub-housing 24 is of generally rectangular form, and comprises side walls 30 turned up from flange portion 23 (Fig. 5), end walls 31, and an overlapping top wall 32, the walls being secured together, as by welding or solder, to form, together with diaphragm 22, a sealed compartment.

Threaded in an opening in an inclined portion of the top wall 32 is a solenoid device, generally indicated at 33, comprising a sleeve 34, the upper end of which is closed by a plug 35, and a plunger 36 freely reciprocable in the sleeve and limited in upward movement by a round-ended stop pin 37, secured in plug 35, which cooperates with a concentric conical recess 38 in the upper end of the plunger to center that end in the sleeve when the plunger is attracted by the energization of coil 39. The plunger is generally square in cross-section, its corners being rounded so that the plunger is a loose fit in the sleeve. The corners 40 of the lower end of the plunger are slightly larger in diameter (but still considerably smaller than the internal diameter of the sleeve) so that, if a lateral force is applied to the lower end of the plunger when it is in its attracted position, only these corners can engage the sleeve. The general solenoid construction shown herein is disclosed and claimed in U. S. Patents No. 2,096,763 (and Reissue thereof No. 21,887) to Ray et al., and No. 2,098,195 to Ray, and will not be further described.

The lower end portion of the plunger 36 is axially slotted to receive one end of a link 45 which is pivoted on a pin 46 secured in the plunger, the other end of the link being pivoted on a pin 47 extending between the side walls of the bent-up left-hand end portion of the channelled lever 29. Between the link and a side wall of the lever is an end portion of an arm 48 which is secured at its thickened other end to a rod 49 sealingly journalled in openings in the side walls 30 of the sub-housing, for a purpose hereinafter to be described. The arm 48, being rotatable on a center different from that of the unit composed of lever 29 and arm 28, is slotted to receive pin 47.

By its linked connection with lever 29, when the solenoid plunger is attracted by energization of coil 39, arm 28 is rocked to move closure member 15 to its open position against the bias of spring 19. It will be noted that the counter force of spring 19 is applied laterally to the lower end of the plunger (the general axis of movement of link 45 being at an angle to the axis of the plunger) so that, while its upper end is centered by pin 37, its lower end portion 40 is held tightly against the right-hand side of the sleeve, as is shown in Fig. 2. The components of magnetic and mechanical forces applied to the plunger in its attracted position serve to prevent vibration and hum when the solenoid is energized by alternating current. Due to the inclined position of the solenoid, gravity acting on the plunger also contributes to this effect, and may, in modified constructions, be the controlling factor. These features are claimed in the aforementioned parent application, Serial Number 407,932, now Patent No. 2,358,999, granted September 26, 1944.

Extending through an opening in a horizontal portion of the top wall 32 of the sub-housing 24 is a rod 50 which is provided, at its lower end, with a conical head 51, spaced above which, and attached to the rod, is a collar 52 having an upper facing 53 (Fig. 3) of leather, or the like. The upper portion of the rod 50 is guided in an opening in the top portion of a U-shaped bracket 54, mounted on the wall 32, and extends freely through an aligned opening in the top wall of a cylindrical protective housing 55, which is frictionally mounted on the turned-up peripheral portion of flange 23. Rod 50 is urged upwardly by a spring 56, secured at one end to the rod and at the other to the wall 32, so that, in the normal position of the rod as shown in Fig. 1, the collar 52, by its facing 53, seals the adjacent opening around the rod. It will be noted that, in the event of rupture of the diaphragm, leakage of fluid would be confined to the space defined by the interior of the sub-housing and the solenoid sleeve.

Furthermore, the diaphragm 22 serves to isolate the plunger 36, the sleeve 34, and the exposed parts of stop pin 37 from the flow of gas controlled by the valve. Accordingly, there is no danger of the valve sticking in open position on account of the accumulation of gummy deposits from the gas flow. In addition, the sealed sub-housing 24 ensures against the entry of any other form of foreign matter that may interfere with free movement of plunger 36.

The head 51 of rod 50 is cooperable with the hooked end 57 of the bent-up right-hand end portion of lever 29. In the event of failure of electrical supply for the solenoid 33, the valve may be operated by manipulation of rod 50. When this rod is moved downward by finger pressure on a button 58, the lever 29 is rocked, the hook 57 riding on the tapered surface of cone 51 until it drops into the recess 59 between the cone and the collar 52, the parts assuming the positions shown in Fig. 3. Pressure on button 58 may now be released, the closure member 15 being held in substantially full-open position by engagement of hook 57 with head 51.

It will be noted that, in the manual opening of the valve, the solenoid plunger 36 is moved only partially toward its attracted position, so that, upon resumption of electrical supply, it is moved still farther upward, thereby rocking lever 29 so that the engagement of hook 57 with the head 51 is released and the rod 50 returns to its normal raised position under the influence of spring 56.

As is seen in Fig. 6, the guide hole for rod 50 in the top portion of bracket 54 provides a tongue 60 which extends into a shallow slot 61 formed in the upper side wall of rod 50. This slot is wider at its upper end than at its lower, so that limited rotation of the rod is permitted when it is in its depressed position. Spring 56 is so arranged that it exerts a rotative force on rod 50, tending to retain the vertical, or right-hand, side of the slot 61 in engagement with the tongue 60. If it is desired to reclose the valve (after it has been manually opened) before the resumption of electrical supply, the button 58 is rotated to its "Release" position, shown in Fig. 4, against the torsional bias of spring 56, thereby bringing a flattened or cut-away surface 62 of the otherwise conical head 51 into register with hook 57, so that the rod can then move upward to permit the valve to close under the force of its bias.

If the solenoid is connected to the electrical supply service in series with an automatic controlling device, such as a thermostat, or other limit-control, it is desirable that the valve, upon resumption of electrical service after the valve has been manually opened, should immediately close if the limit-control is calling for such operation. However, under such condition of the limit-control, its switching means would generally be open, so that no energy would normally be available at the solenoid for raising its plunger to release the manual holding means. To overcome this defect, I have provided switching means, actuated by the manual valve-operating means, whereby the plunger will be released upon resumption of electrical service, regardless of the condition of the limit control. These means are more clearly shown in Fig. 5, and comprise a pair of resilient contact blades 65 and 66 which are mounted on an insulating base 67 by means of posts 68 and 69, respectively, the base being attached to the ear portions 70 of the bracket 54. In the downward movement of rod 50, a pin 71 (preferably of insulating material) carried thereby, engages blade 65 and flexes it into contact with blades 66, as shown in Fig. 3. Post 68 is connected by a wire to a terminal plate 72 and post 69 to another plate 73, to which plate one lead of the solenoid is also connected. The other solenoid lead is connected to a third terminal plate 74. The corresponding terminal posts, shown on housing 55 in Fig. 7, have been assigned primed numerals. Referring to the corresponding diagram of Fig. 8, it will be seen that the contact blades are connected in shunt with the terminals of a thermostat 75, and that the thermostat is connected in series with the power supply terminal 76 and one lead of the solenoid, the other solenoid lead going directly to the other power supply terminal 77. The blades 65 and 66, when in contact, thus complete a circuit from the power supply terminals to the solenoid independent of the thermostat, so that, upon resumption of electrical service, the solenoid plunger is attracted to its fully raised position, releasing the rod 50, the resultant upward movement of the rod effecting disengagement of the contact blades. If the thermostat switch is now in closed condition, the plunger remains in energized position, since the solenoid is connected to the power terminals through this switch; but, if the thermostat switch happens to be open after the plunger is initially attracted, it then falls when the blades 65—66 separate.

Referring now more particularly to Fig. 7 and the corresponding diagrammatic showing of Fig. 8, rod 49 is connected by arm 48 to the lever 29 so that it moves in accordance therewith, as was described hereinabove. Yieldably connected to an end of rod 49, exterior to the sub-housing 24, by its volute portion 80, is a resilient arm 81 which insulatingly carries on its free end a contact element 82. Cooperable with this contact element is another similar element 83 mounted on a bracket 84 which is insulatingly attached to the flange 23. Insulated terminals 85 and 86 are provided for the electrical connection of the contact elements in a circuit, terminal 86 being connected to element 82 by a flexible wire 87. Also mounted by one of its ends on flange 23 is a U-shaped bimetallic member 88, the free end of which carries a head 89 normally positioned immediately above a solid portion of arm 81, and adjacent an opening 90 formed therein, this opening being of such size and shape as freely to receive the head 89 and the portion of member 88 to which it is attached. Wrapped around a portion of the bimetallic member is a resistance coil 91 which, when energized by passage of current therethrough, is effective to heat the bimetallic member so that its free end warps in a left-hand direction.

When the solenoid is energized, in the opening movement of the valve, the rod 49 is rotated in a clockwise direction (as viewed in Fig. 7) so that arm 81 is moved into engagement with the head 89 of the bimetallic member, additional rotation of the rod effecting flexure of the arm and, in particular, of its volute portion 80. As is shown in Fig. 8, the resistance coil 91 is connected in parallel with the solenoid so that heating of the bimetallic member is now initiated. After a predetermined interval, warping of the bimetallic member moves its head 89 into register with opening 90, with the result that arm 81 is suddenly projected upward, bringing contact elements 82 and 83 into engagement, as is shown in broken lines in Fig. 7. In this position of arm 81, the upper edge of the head 89 is latched under the portion of arm 81 adjacent the left-hand edge of opening 90 due to the arcuate path of the end of this arm. Continued energization of the resistance coil effects slight additional movement of the bimetallic member in a left-hand direction until the portion thereof above head 89 is in engagement with the left-hand edge of the opening, in which position it remains during the energization of the resistance coil and solenoid. Should such energization now be discontinued, the valve closes and the arm 81 tends to assume its normal position. However, due to the engagement of head 89 with the underside of arm 81, the same is restrained from movement until the bimetallic member has cooled sufficiently again to bring its head into register with the opening 90, whereupon arm 81 moves suddenly downward, opening contacts 82—83. The time-delay feature may, for example, be advantageously employed in connection with the control of the circulating fan of a hot-air heating system. Referring to Fig. 8, and assuming that the closure member 15 is arranged to control flow of fuel to a gas-consuming hot-air furnace, fan 92 will be operated upon engagement of contacts 82, 83 a predetermined interval after the opening of the valve, and its operation will be continued for an interval after the reclosing of the valve, so that the air will be circulated while, and only while, it is hot. Terminals 93 of the fan circuit are preferably connected directly to the service lines, the valve and control terminals 76—77 usually being connected to a low-voltage supply to minimize fire hazard in the thermostat circuit. In Fig. 8, a damper 94 is shown connected for operation by rod 49. Such a damper may, for example, conveniently be employed to control the supply of auxiliary air to the furnace, and is opened concurrently with the opening of the fuel valve.

I claim as my invention:

1. In combination: an operator for a first load movable between two positions; means for moving said load operator; a movable member for operating a second load; a connection between the member and the operator for normally moving the movable member with the operator, including an element capable of storing energy; first restraining means movable transversely of said member and engageable with the member for restraining said member against movement from one position; second restraining means movable transversely of said member and engageable with the member for restraining said member against movement from the other position; said restraining means when operative causing energy to be stored in said element upon movement of said load operator; and time delay means operated upon respective changes in position of said load operator to move the respective restraining means to disengaging positions upon the lapse of a predetermined period of time.

2. In combination: an operator for a first load movable between two positions; means for moving said load operator; a movable member for operating a second load; a connection between the member and the load operator for normally moving the movable member with the operator, including an element capable of storing energy; means operable at opposite positions of said member and engageable with the member to restrain said member from moving to the alternate positions respectively; and time delay means operatively associated with alternate operation of said moving means to release the restraining means to permit said movable member to move to the alternate position under the influence of energy stored in said element upon the lapse of a predetermined period of time.

3. In combination: an operator for a first load movable between two positions; means for moving said load operator; a movable member for operating a second load; a connection between the member and the operator for normally moving the movable member with the operator, including an element capable of storing energy; a thermally responsive member movable transversely of said member and having first means positionable for restraining movement of said member from one position to the other position, said thermally responsive member also having second means positionable for restraining movement of said member from said other position to said one position; means energizable upon movement of said load operator to one position for applying heat to said thermally responsive member to move said thermally responsive member to a position in which said first restraining means is effective and said second restraining means is ineffective; means deenergizing said heat applying means upon movement of said load operator to the other position for permitting said thermally responsive member to move to a position in which said first restraining means is ineffective and said second restraining means is effective.

4. In combination: an operator for a first load movable between two positions; means for moving said load operator; a movable member for operating a second load; a connection between the member and the load operator for normally moving the movable member with the operator, including a resilient yieldable element capable of storing energy; said movable member having an edge forming an opening; a thermally responsive time delay member having a projection means movable transversely of and engageable with said movable member; and means operatively associated with said moving means to change the thermal condition of said thermally responsive member to move said projection means between alternate positions; said projection means being registrable with said opening when said thermally responsive member is at an intermediate position, and respectively restraining movement of said movable member from alternate positions when said projection means are out of registry from said opening.

5. In combination: an operator for a first load movable between two positions; means for moving said load operator; a movable member for controlling a second load; a connection between the load operator and the member for normally moving the movable member with the operator, including a resilient yieldable element capable of storing energy; said movable member having an edge forming an opening; a bimetal member having an end provided with a projection movable transversely of said movable member and into registry with the opening thereof when said bimetal member is in an intermediate position; opposite portions of said projection releasably restraining said movable member in alternate positions; and means operable upon operation of said moving means to change the thermal condition of said bimetal member to move said bimetal member between extreme positions.

6. In combination: an operator for a first load movable between two positions; means for moving said load operator; a movable member for controlling a second load; a connection between the member and the load operator for normally moving the movable member with the operator, including a resilient yieldable element capable of storing energy; a thermally responsive member movable transversely of said movable member and having abutment means positionable for restraining movement of said movable member from one position to the other position, said thermally responsive member being movable in one direction to release said movable member for movement to said other position by the energy stored in said yieldable element; latch means carried by said thermally responsive element engaging said movable member upon movement to said movable member to the other position to restrain movement of said movable member from said other position to said one position; said latch means releasing said movable member upon movement of said thermally responsive member in the other direction; and means operatively associated with said moving means for changing the thermal conditions of said thermally responsive member to move said thermally responsive member in alternate directions, said thermally responsive member in one position releasing said abutment means and operatively positioning said latch means, said thermally responsive member in the other position releasing said latch means.

7. In combination: an operator for a first load movable between two positions; means for moving said load operator; a movable member for operating a second load; a connection between the member and the load operator for normally moving the movable member with the operator, including a resilient yieldable element capable of storing energy; abutment means engageable with and movable transversely of said movable member for restraining said movable member from moving from one position to the other position; said abutment means being movable to release said movable member for sudden movement from one position to the other position; catch means engageable with said movable member upon arrival of said movable member to said other position for restraining said movable member from moving from said other position to the said one position; and time delay means operatively associated with said moving means respectively for moving said abutment to inoperative position, and for releasing said catch.

References Cited in the file of this patent

UNITED STATES PATENTS

| | | |
|---|---|---|
| 1,839,935 | Thomas | Jan. 5, 1932 |
| 2,072,163 | Frank et al. | Mar. 2, 1937 |
| 2,086,709 | Fike et al. | July 13, 1937 |
| 2,446,834 | Kaufman | Aug. 10, 1948 |